United States Patent [19]

Lewis et al.

[11] 4,294,569
[45] Oct. 13, 1981

[54] SINGLE COLUMN LOAD DIVIDING GATE

[75] Inventors: Alfred E. Lewis, Tustin; Robert E. Salisbury, Whittier, both of Calif.

[73] Assignee: Preco Inc., Los Angeles, Calif.

[21] Appl. No.: 48,454

[22] Filed: Jun. 14, 1979

[51] Int. Cl.³ .................... B60P 17/14; B61D 17/10
[52] U.S. Cl. ............................ 410/133; 410/134; 410/153
[58] Field of Search .................. 410/133, 134, 153

[56] References Cited

U.S. PATENT DOCUMENTS

| | | | |
|---|---|---|---|
| 3,200,773 | 8/1965 | Moorhead | 410/133 |
| 3,549,291 | 12/1970 | Pettigrew et al. | 410/134 |
| 3,641,942 | 2/1972 | Konrad et al. | 410/133 |
| 3,741,127 | 6/1973 | Williams | 410/134 |
| 3,745,934 | 7/1973 | Williams | 410/133 |
| 4,208,970 | 6/1980 | Matyas | 410/134 |

Primary Examiner—Richard A. Bertsch
Attorney, Agent, or Firm—Charlton M. Lewis

[57] ABSTRACT

The present suspension mechanism for load dividing gates of single column type promotes reliability and safety by extreme simplicity and unity of carriage structure, together with highly effective provision against structural failure even of the inherently rugged support elements. By means of features including special bearing design, roller placement and novel keeper support, the invention provides suspension of a column gate from a single track with security against structural failure believed at least equal to that normally attained for conventional gates with dual track support. Improved manual control mechanism for the locking pins provides in highly compact and reliable form independent operation either from inside the car or from outside through an open doorway.

23 Claims, 14 Drawing Figures

SINGLE COLUMN LOAD DIVIDING GATE

BACKGROUND OF THE INVENTION

This invention has to do with load dividers of a novel type which will be referred to as column load dividers and which are designed especially to stabilize certain types of lading in railway freight cars.

That specialized lading is well illustrated by the shipment of automobile parts from the factory to the assembly plant. Such parts are loaded into rigid racks or baskets which are typically of uniform external size and are individually strong and rigid. Such baskets can be stacked from floor to roof and are typically placed crosswise in the car, forming two rows of stacks which fill the width of the car with only enough clearance for convenient handling by a forklift truck. Two equal rows of such stacks then form a rectangular lading configuration which extends from the car end wall inward toward the center of the car a distance which may vary with the number of baskets in the load.

It has been common practice to anchor such a lading configuration in the car by means of a conventional load dividing bulkhead which extends continuously across the exposed face of the lading and is locked at its four corners to rails mounted in the car. However, especially in the very large high cube cars commonly used in automobile parts service, the correspondingly large size and necessarily strong construction of such load dividing bulkheads tends to make them unreasonably heavy, inconvenient to handle and potentially dangerous.

It has recently been appreciated that, if the exposed face of such a lading configuration were restrained only close to the vertical car side walls, the central portion of the face would also be effectively stabilized, due to the rigidity of the bastkets and their close fit within the width of the car. It has therefore been suggested that the gate structure for restraining each lading configuration have the form of two gates each of which extends inward from one of the side walls transversely of the car, but only for the minimum distance consistent with making the gate sufficiently strong and providing sufficient area of contact with the lading to avoid excessive local stresses upon it. Such a gate comprises essentially a vertical column, with means for supporting it and moving it along the car side wall and for locking it at a selected position with its working face opposing the face of the lading. With a pair of such gates opposing the lading in each end of the car, though only the two opposite edge portions of each lading face are directly anchored, the entire lading is effectively restrained.

OUTLINE OF THE INVENTION

A primary purpose of the present invention is to provide such load dividing gates of column form having novel and useful structural and functional capabilities.

More particularly, the invention aims to provide such columnload dividers that are well adapted to be both movably suspended and rigidly locked to the ceiling tracks that already exist in many high cube cars, wherein they were installed for carrying and locking the previously used full bulkhead structures. Those previous track installations include two dimensionally distinct forms, both of which are accommodated by the suspension mechanism of the invention.

A further object of the invention is to provide column load dividers of such form that the two columns suspended on each track can be placed closely adjacent each other, thereby enabling them to be operated conveniently between closely spaced lading faces.

The invention further includes improved location of two supporting rollers on the suspension carriage, by which apparently incompatible requirements may be reconciled.

A further aspect of the invention provides mechanism for coupling the two rollers in a manner tending to maintain each roller in operative position on the track despite possible failure of its normal journal structure. That mechanism is typically integrated with structure for positively coupling the carriage to the track under normal and also certain abnormal conditions.

Another aspect of the invention concerns provision of protective housings for the locking pins by which the column load dividing gate may be locked in selected position on the track.

The invention further provides improved mechanism for controlling the locking pins, whereby two handles may be used selectively, with the idle handle disconnected from the pins and retracted within a protective recess formed by the column structure.

Those and other objects and advantages of the invention will be more fully understood from the following description of an illustrative preferred structure embodying the invention, and of selected illustrative modifications of that structure.

THE PRIOR ART

Certain aspects of the present invention concern functions which are somewhat analogous to functions provided in different ways in conventional load dividing gates that extend continuously across half or all of the width of the car. For example, although the compact form and correspondingly reduced weight of the present single column gates are highly advantageous, they are accompanied by greatly restricted space within the gate for such apparatus as the crank mechanism for operating the locking pins. Hence prior art such as U.S. Pat. No. 3,352,257 to Lehnert et al has only limited pertinence, as pointed out more fully below.

Also, the full gates of the prior art are ordinarily supported jointly by two tracks, one on each side of the car. The suspension then typically includes a timing shaft which extends across the car with a rotatively fixed roller riding each track and with sprocket teeth engaging sprocket holes in the track. The gate may then be suspended directly from the shaft, or may be pivotally mounted on a carriage frame on which the shaft is journaled, with or without a second shaft with its own rollers. In such suspensions the sprocket engagement is typically made positive, as by a rigid track flange spaced closely above the sprocketed roller, or by a rigid hold-down arm extending from the gate or carriage immediately below the track. The timing shaft axis is then defined in both its coordinates, being confined to a horizontal plane and also held square with the length of the car. That retaining action greatly stabilizes the entire suspension.

In contrast to that structure, each of the present single column load dividers is suspended from a single track. The usual stabilizing action of a timing shaft is then not available, and different structure is needed for normally defining the orientation of roller axes in both vertical and horizontal planes.

Similar factors distinguish column load dividers from full gates with respect to security against possible failure of mechanical structure. Difficulties due to dependence upon a single track for support are further complicated by the present objective of accommodating the single column suspension to a particular existing form of upper track. As a precaution against failure of a roller shaft, for example, neither the structure described in U.S. Pat. No. 3,549,291 to Pettigrew et al, assigned to the same assignee as the present application, nor the structure described in U.S. Pat. No. 3,200,773 to Moorhead solves the present problem because those structures require a specially formed track flange above the rollers. Although the keeper member shown by Pettigrew, which is journaled with respect to the sprocketed roller and carries both a retaining arm below the track and a safety cable, may serve a useful purpose without the special upper track flange, it would not be capable of retaining the roller on the present track in case of shaft failure.

Conventional full gates mounted with a timing shaft on tracks of the present form have sometimes been required to include safety arms rigidly mounted on the gate-supporting carriage or on the gate itself and extending laterally above the respective tracks with hook formations back of the vertical track flanges. In case of shaft failure at either side of the gate that hook is intended to rest on the track and prevent the gate from falling. However, the action of each hook is reliable only if the gate is supported at the other track, and could not provide security for a column load divider supported on a single track.

DESCRIPTION OF PREFERRED EMBODIMENTS

Figure 1:
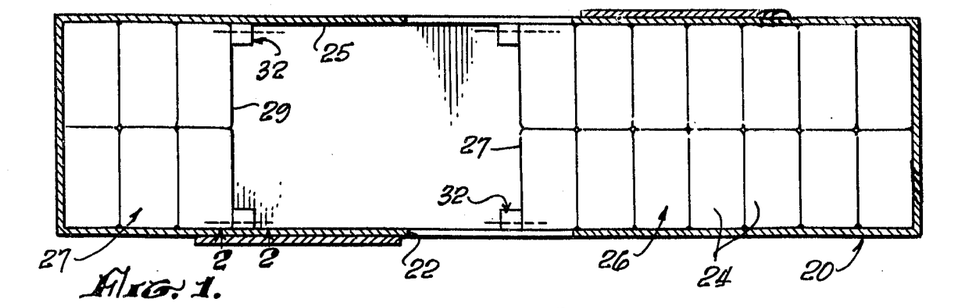
FIG. 1 is a schematic plan illustrating the principle of operation of the column load dividing gates of the invention.

The interior of a freight care is represented schematically at 20 in FIG. 1, with the doorways 22 and the two illustrative lading configurations 26 and 28 in the respective ends of the car with the exposed lading faces 27 and 29. Each configuration comprises two rows of stacked rigid freight carrying baskets or racks 24. The four load dividing gates 30 of column type are locked in positions adjacent the car side walls 25 with their working faces opposing the exposed lading faces. The columns thus retain the side edge portions of each lading face, and thereby effectively anchor the entire lading configuration due to the strength and rigidity of the individual baskets. All four column load dividers are basically identical or closely similar, two being right-hand and two lefthand versions of a common design. Therefore, only one unit will be described in detail.

Figure 6:
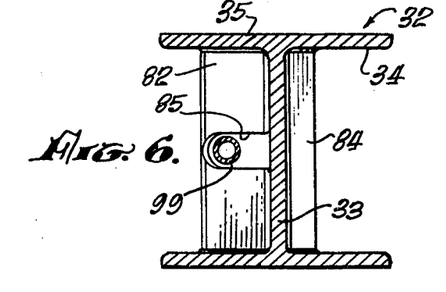
FIG. 6 is a section on line 6—6 of FIG. 5.

Each column proper comprises a heavy aluminum I-beam 32 (FIG. 6) with web 33 and flanges 34, and is mounted in such orientation that a flat outer flange face extends perpendicularly inward from the adjacent car side wall, directly facing the lading and forming the working face 35 of the load divider. The overall beam cross section is preferably approximately square. That proportion of web and flange widths had been found to provide a particularly favorable combination of compact form, good resistance to bending stress, and a irelatively large area of contact with the lading face.

The column is supported from the upper or ceiling track 60 by the carriage 40. That carriage comprises primarily the generally vertical hangar plate 42 and the two sprocketed rollers 44 and 46, which are journaled on the hangar plate by the respective stub shafts 45 and 47 and the bearings 48, to be more fully described. Column 30 is pivotally suspended from the laterally offset and downwardly projecting portion 43 of hangar plate 42 by the heavy pivot pin 38, to be more fully described. Track 60 typically comprises the primary angle member 62, with the vertical mounting flange 63 secured to the car side wall 25 and the horizontal track flange 65; and the auxiliary angle member 66, which is rigidly mounted on flange 65 and reinforces its edge portion. The carriage rollers typically ride the horizontal flange of auxiliary track member 66, which is provided with the racklike sprocket apertures 67 in position to receive the roller sprocket teeth 49. The rollers are thereby retained in alignment on the track, maintaining hangar plate 42 parallel to the track edge. Carriage 40 can be positioned accurately along the length of track 60 by manual drive mechanism, typically comprising the endless chain 50 which drives roller 44 via the pulley 52, rigidly mounted on roller shaft 45. The lower end of chain 50 is preferably guided by passing through the loop 54, mounted on column web 33. That manual drive is made positive by the sprocket teeth on roller 44.

Column 30 is locked in selected position along upper track 60 by the heavy pin member 70, which is mounted for vertical sliding movement relative to the column and carries the two locking prongs 71 at its end. Upon upward projection of the pin, prongs 71 are freely received in a pair of the longitudinally spaced locking apertures 64, formed in primary track flange 65 inward of angle member 66. Accurate positioning of the column on upper track 60 to obtain proper pin alignment is preferably aided by a clearly visible reference mark. As typically shown, the pointer 56 is rigidly mounted at the top edge of the column on the column face opposite from working face 35. The upper edge of the pointer extends across the row of locking apertures 64 and is typically designed to be aligned with an aperture edge when the column is in correct position. The lower end of column 30 is similarly lockable by projection of the lower locking pin 74 downward to insert its prongs 75 into apertures 79 in the lower track 78, which is typically set into the car floor in conventional manner.

Upper and lower locking pins 70 and 74 are typically forgings of generally flat cross section parallel to the column web and to the length of tracks 60 and 78. The pins are mounted substantially in the plane of the column web, the end portion of which is cut away at 81 to accommodate them. A housing for each pin is preferably formed by rigidly mounting the two plates 82 and 84 in mutually parallel spaced relation on opposite sides of the plane of the column web, extending between the column side flanges, to which they are continuously welded. The inner end portions of plates 82 and 84 are bent obliquely toward each other at 83 and are welded to the column web. The plates thus provide dual web formations which replace the missing sections of web 33 and also enclose the upper and lower pin chambers 80. The outer ends of those chambers are closed by the outer guide blocks 86, which typically project slightly beyond the column end and are welded to the column flanges 34 and to dual web plates 82 and 84. Rectangular apertures 87 in blocks 86 guide the pins in their sliding movement. Similar inner guide blocks 88 are mounted within the respective chambers 80 to reinforce the web plates and guide the pins near their inner ends.

Upper and lower locking pins 70 and 74 are driven jointly between their column locking and column releasing positions by manual operation of the crank mechanism 90.

Figure 7:
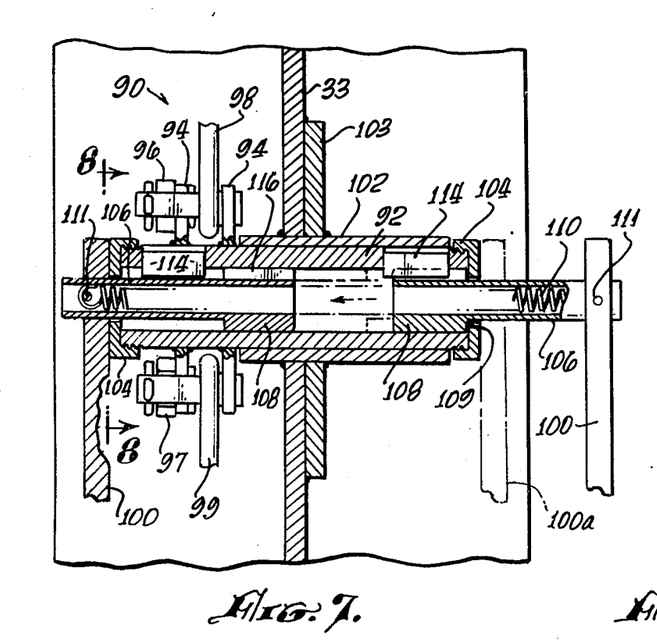
FIG. 7 is a fragmentary section at further enlarged scale on line 7—7 of FIG. 2.

Operation of crank mechanism 90 is controlled by the two handles 100, one of which is accessible at each lateral face of the column, permitting operation from outside the car at the doorway area. The handles are mounted on shaft member 92 by apparatus whereby they are normally uncoupled from the shaft and are retracted into the column between its flanges 34 when not in use; and become automatically coupled to the shaft as they are drawn axially outward into operating position. Mechanism for producing a mode of operation somewhat similar to that has been described previously, for example in patent 3,352,257 to Lehnert et al, but only in connection with a full width load dividing gate in which the two side handles are widely separated with ample axial space between them. The present structure, on the other hand, must be compressed axially into only a few inches to recess the entire coupling mechanism within the outline of the column flanges. FIG. 7 represents an illustrative mechanism in accordance with one aspect of the present invention, which meets those rigorous space requirements and also provides a distinctive mode of operation.

The entire crank mechanism 90 of FIG. 7 is mounted on column web 33 by means of the sleeve bearing 102, which is rigidly mounted in a bore in that web, preferably with the aid of the reinforcing plate 103. The tubular shaft member 92 is journaled in the sleeve bearing 102, and has an annular cap 104 threaded on each end, the diameter of the central cap aperture being smaller than the inner diameter of shaft 92. The dual crank plates 94 are rigidly mounted in axially spaced relation on shaft 92 adjacent the left end of bearing 102, as seen in FIG. 7. Shaft 92 is well supported in the relatively long bearing 102, and is axially positioned in the bearing by a crank plate 94 on one side and a cap 104 on the other. The crank pivot pins 96 and 97 are mounted in plates 94 in oppositely eccentric relation and are coupled to the respective locking pins 70 and 74 by the tubular links 98 and 99. Those links pass through generous clearance slots 85 in the web plates 82 and are pivotally connected to the locking pins at 95. Links 98 and 99 are preferably adjustable in length, as indicated at 91 in FIG. 8, to obtain the desired depth of insertion of the locking prongs into their respective tracks.

Each handle 100 is rigidly mounted, as by welding, on the outer end of a short handle tube 106, which is mounted for rotational and axial movement within shaft 92. The axial portion of each tube near the handle fits freely the central aperture in shaft cap 104, while the remainder of the tube at 108 is enlarged to fit freely the inner diameter of shaft 92 and to form the axially facing shoulder 109. The tension spring 110 extends within both handle tubes 106 between the pins 111, fixed at their opposite ends. The spring is prestressed to exert sufficient tension upon both handle assemblies to normally retract them to stowed position, illustrated by the left handle in FIG. 7. That stowed position is typically defined by contact of each handle at the outer face of cap 104. When in that stowed position the handle itself is substantially retracted within the recess between the flanges 34 of the column, and is rotationally free of shaft 92 and thus uncoupled from the locking pins 70 and 74.

Figure 8:
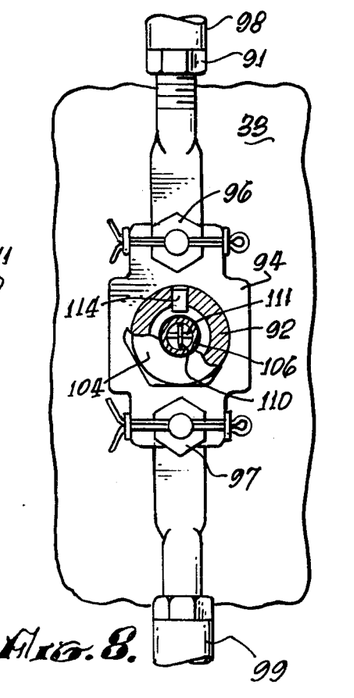
FIG. 8 is a fragmentary section on line 8—8 of FIG. 7.
Figure 9:
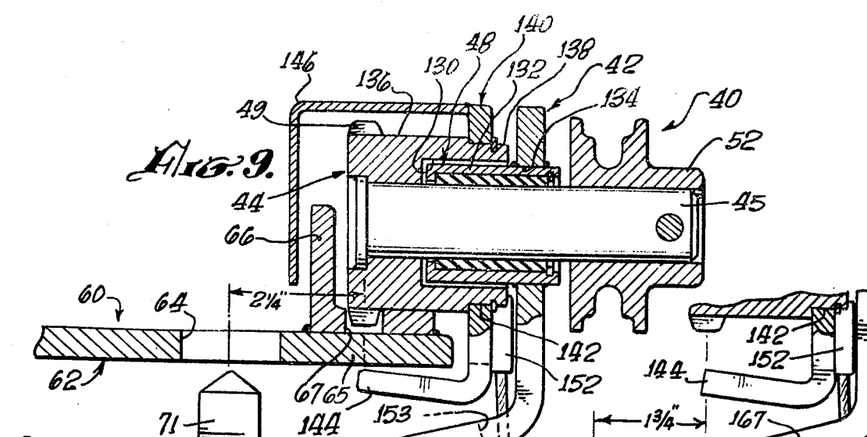
FIG. 9 is a section at the scale of FIGS. 7 and 8, corresponding generally to a portion of FIG. 4 and taken on line 9—9 of FIG. 12.
Figure 10:
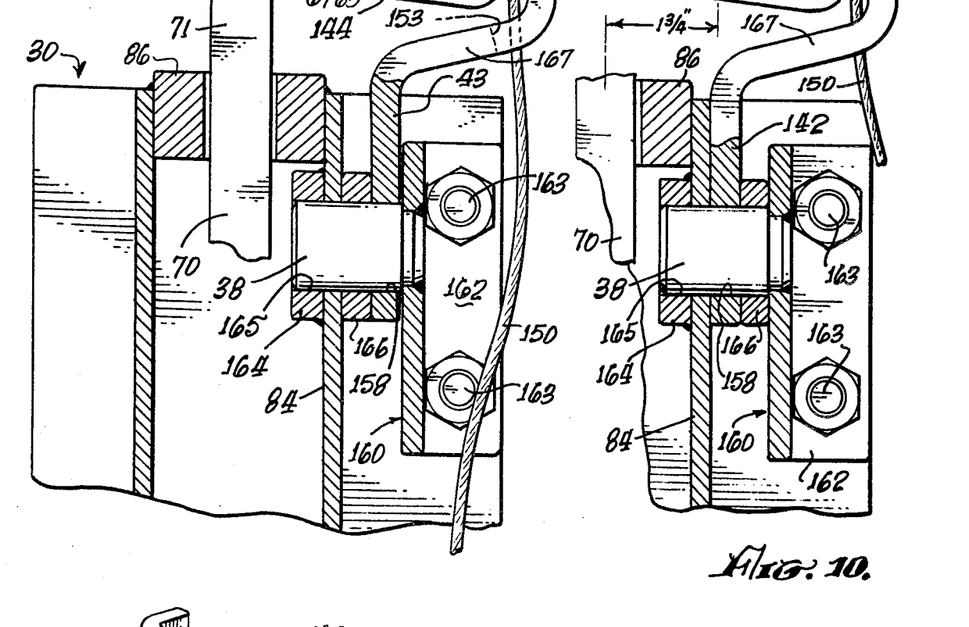
FIG. 10 is a portion of FIG. 9 but representing a different condition of lateral adjustment of the column.
Figure 11:
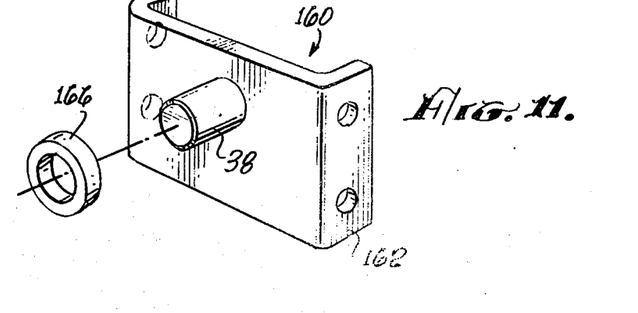
FIG. 11 is a perspective representing a portion of the illustrative adjustment mechanism.

A spline connection is provided at each end of shaft 92 for automatically engaging the corresponding handle tube 106 by virtue of outward axial movement of that tube to its operating position, illustrated in solid lines at the right of FIG. 7 and defined by contact of shoulder 109 with the inner face of cap 104. As typically shown, that spline connection at each end of shaft 92 comprises the key 114, formed by a bar of rectangular section set and welded in a fitting slot in the tubular shaft, and a matching keyway 116, cut in the enlarged portion 108 of the handle tube. The key and keyway are preferably in such angular relation that they mate when handle 100 is vertical and crank plates 94 are at dead center, that is, when locking pins 70 and 74 are projected into column locking position, as shown in FIGS. 7 and 8, for example.

With that arrangement, when the column load divider is locked in a selected position in the car, which is the normal condition whether the column is idle or is actively restraining a lading configuration, both handles 100 are retained by spring 110 in stowed and uncoupled position. However, either handle can be directly withdrawn manually to operating position, and then automatically engages the spline mechanism. Handle rotation in either direction through approximately a right angle then retracts both upper and lower locking pins from their tracks, releasing the column for movement of its carriage along upper track 42. During such operation of one handle, the other handle is normally retained by spring 110 in its uncoupled stowed position between the column flanges. However, if the column position makes both handles accessible, both can be individually coupled to the crank mechanism at the same time, if desired. After the column load divider has been moved to a selected new location, return of the handle to vertical position projects the locking pins into locking relation with the tracks. Mere release of the handle then causes spring 110 to retract the handle to stowed position between the column flanges.

Figures 2, 3:
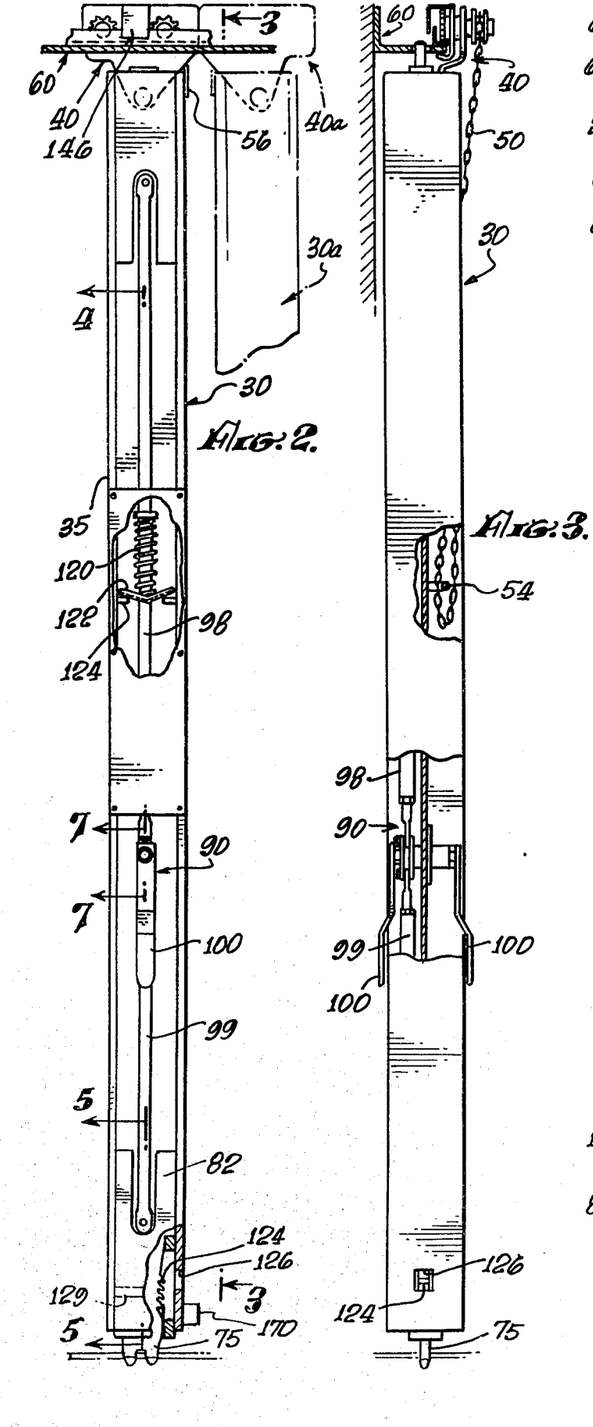
FIG. 2 is an elevation representing an illustrative column load divider in the aspect of line 2—2 of FIG. 1 and embodying the invention.
FIG. 3 is an elevation in the aspect of line 3—3 of FIG. 2.
Figure 4:
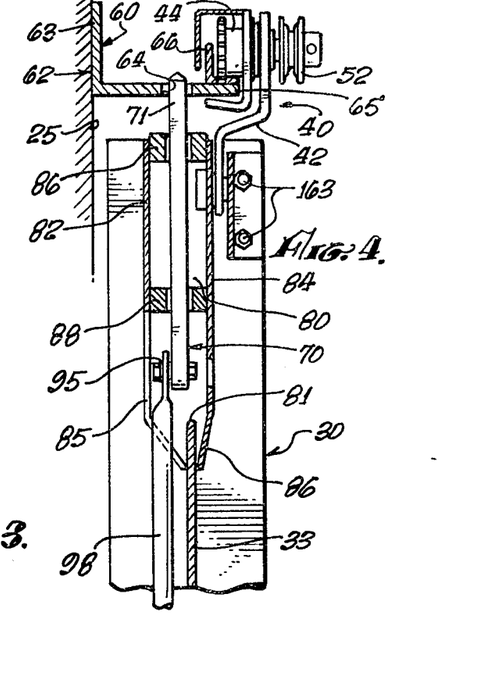
FIGS. 4 and 5 are fragmentary sections at enlarged scale generally on the respective lines 4—4 and 5—5 of FIG. 2.

Suitable mechanism is preferably provided for normally retaining crank mechanism 90 in dead center position with the locking pins 70 and 74 projected into locking relation with their tracks. A preferred form of such mechanism is represented in FIG. 2 as the compression spring 120 which surrounds link 98. The upper end of spring 120 is seated on an annular cup axially fixed to the link; its lower end on the washer 122 which can slide freely along the link. Washer 122 is bent along a diameter to form a shallow V-section, and is supported on a fixed member 124 of such form that the washer is cammed upward by the lateral movement of link 98 which results from initial rotation of the crank mechanism away from dead center. Since that camming action compresses the spring, the spring force not only urges the locking pin into a track aperture, but also restores the crank to dead center position. The structure and action of spring 120 is more fully described and claimed in U.S. Pat. No. 3,464,369, assigned to the same assignee as the present application. Spring 120 is preferably strong enough to drive the locking mechanism to locking position upon release of handle 100. The column then becomes locked at once if the locking pins are opposite track apertures when the handle is released. Otherwise, locking takes place as soon as the column shifts to a position in which locking can occur. In either case, the above described action of crank mechanism 90 automatically retracts the handle to stowed position as soon as it becomes vertical.

Release of the locking pins is occasionally made difficult by abnormal pressure of the lading against the working face 29 of the column load divider. To facilitate pin release under such conditions lower locking pin 94 is provided with the rack-like teeth 124, preferably in the pin edge which faces away from the lading. The small pry window 126 is cut in the similarly facing column wall for insertion of a pry-bar for manually prying the pin upward at the same time that torque is applied to one or both of crank handles 100, much as in full gate load dividers.

Figure 5:
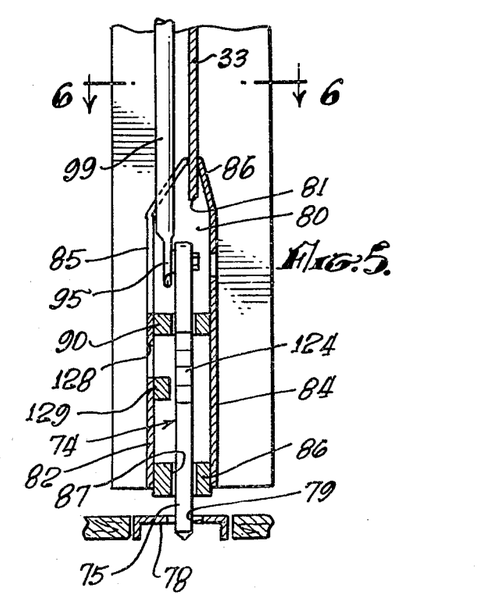

When a car is fully loaded, the opposing lading faces 27 and 29 may be so close together that access to pin teeth 124 through window 126 of each column is blocked by the opposite column. The present structure overcomes that difficulty by providing a second pry window 128 on the side of each column facing the car side wall. Window 128 opens through web plate 82 (FIG. 5), providing access to teeth 124 from the side through an open car doorway 22. The lower edge of that window 128 is preferably strengthened by the fulcrum bar 129, which is typically welded to the inner face of the web plate and to the column side flanges prior to installation of the opposite web plate 84. Under the full-load condition described, at least one column is within the car door opening 22 (FIG. 1), providing convenient access to pry teeth 124 from the side through side window 128.

Typical preferred structure of carriage 40 is shown in further detail in FIGS. 9 to 12. Rollers 44 and 46 are bored to receive the respective rigidly mounted stub shafts 45 and 47, and are deeply counterbored at 130 to provide clearance for the sleeve bearings 48. Each of those bearings typically comprises a metal sleeve 132 enclosing an antifriction bushing of Teflon or the like. The bearing sleeves are rigidly mounted, as by welding, in accurately spaced bores 134 in hanger plate 42, projecting into the roller the full depth of counterbore 130. Each roller shaft is axially positioned relative to the bearing sleeve at one end by the counterbore shoulder and at the other end by the strongly pinned chain drive pulley 52 on shaft 45 and the collar 53 on shaft 47. The deep penetration of the bearing sleeves into the roller hubs directly supports the roller shafts virtually within the load bearing working surfaces 136 of the rollers.

Each roller also has an annular cuff portion 138 which surrounds the bearing sleeve in closely spaced relation and terminates closely adjacent hangar plate 42. The keeper plate 140 is horizontally elongated (FIG. 12), and both the rollers are journaled on the plate by means of the accurately spaced bores 142 which receive roller cuff portions 138 with a relatively free fit, and suitable retaining rings. The orientation of each roller is thereby stabilized in the sense that its axis is maintained perpendicular to the plane of the keeper plate. Due to the relatively free fit of the roller cuff journals, that stabilizing action becomes effective only as a back-up to the far more precise definition of the roller axes by sleeve journals 48, which act directly relative to hangar plate 42. If either roller shaft should fail, for example, its axis continues to be held perpendicular to the hangar plate by the described back-up stabilization, acting through keeper plate 140 and the other roller.

That safety stabilization is especially effective in combination with the deep axial penetration of bearing sleeve 132 into the roller hub, already referred to. Upon failure of a roller shaft the roller is still supported on the outer surface of sleeve 132, acting as a plain bearing. Under that condition the roller is retained axially on the sleeve by the keeper plate, which is held parallel and close to hangar plate 42 by its journal connection to the other roller. No such stabilizing action is available without the common keeper plate on which both rollers are journaled.

Figure 12:
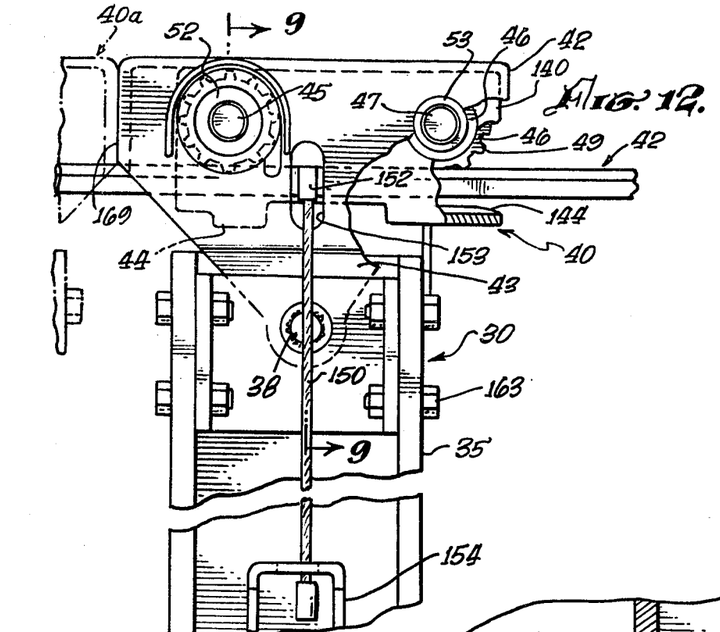
FIG. 12 is a fragmentary elevation at enlarged scale in the aspect of line 12—12 of FIG. 4.

The lower edge portion of keeper plate 140 is bent laterally, extending at 144 below the horizontal flange of upper track 60 and terminating at an edge closely spaced from that flange directly below roller sprocket teeth 49. A single keeper flange may extend the full length of the keeper plate, or, preferably, spaced keeper flanges or fingers 144 are provided for each roller, as indicated in FIG. 12. Since keeper plate 140 is mounted directly on the rollers, its retaining flange 144 positively holds each roller close to the track, insuring proper engagement of its sprocket teeth in sprocket apertures 67 and therefore in proper alignment on the track. The keeper plate therefore has a safety retaining action on each roller basically similar to that described in connection with full width bulkheads in U.S. Pat. Nos. 3,358,617 and 3,549,291, for example, which are assigned to the same assignee as the present application. However, the present structure has the significant advantage that the keeper plate is journaled jointly with respect to two rollers. It therefore not only retains each roller on the track via its own sprocket teeth; but provides valuable emergency stabilization of each roller via the keeper plate and the other roller.

Additional security is provided by the back keeper 146, rigidly mounted at the upper edge of keeper plate 140 and extending horizontally and then downward in closely spaced relation behind the vertical flange of auxiliary track angle 66. In combination with keeper flange 144, back keeper 146 positively couples the keeper plate, and therefore also the two rollers, to the rigid angle structure of the track.

A further advantage of providing two support rollers for each of the present carriages, with a common keeper plate for the two rollers, relates to provision of an emergency safety cable. Such a cable is indicated somewhat schematically at 150, with its upper end permanently coupled to keeper plate 140 approximately at the midplane of column 30 as seen in FIG. 12. The cable passes through a clearance aperture 153 in hangar plate 42, and its lower end is releasably coupled to the column web by a fitting of any suitable type, indicated schematically at 154. Any load on cable 150 is then divided between the two roller structures, reducing any tendency to wrench the keeper plate clear of the track.

Column 30 is suspended directly from hangar plate 42, preserving the full security of unitary structure between mounting pivot 38 and roller bearings 132. The present mounting structure further provides convenient capability for accommodating the different dimensions of two styles of upper tracks 60, both of which have been installed in appreciable numbers in existing high cube cars. That difference is a variation of one half inch in the distance between the center lines of the locking apertures 64 and the sprocket holes 67.

Pivot 38 is freely received in a fitting bore 158 in the lower corner of hangar plate 42, and is rigidly but demountably supported on the column structure. In the preferred structure shown, the pivot pin is fixedly mounted at one end in a bore in the mounting plate 160. Plate 160 has mounting flanges 162 at its ends, which are secured by the bolts 163 to opposing column flanges 34 with the pivot pin extending into the fitting bore 165 in column web plate 84 and the reinforcing plate 164. The pivot pin is thus effectively rigidly supported at both ends.

The above described dimensional difference among existing upper tracks is acommodated in the present column mounting structure by locating the holes for bolts 163 in the column flanges so that the space between mounting plate 160 and column web plate 84 is one half inch greater than is needed to receive hangar plate 42. That excess half inch is then filled by the spacing collar 166. That collar is placed between the hangar plate and web plate for one style of upper track, as in FIG. 9, and between the hangar plate and mounting plate 160 for the other style of track, as in FIG. 10. The described structure has the particular advantages that bolts 163 and conveniently accessible for changing the adjustment and that in both conditions of adjustment the structure is fully rigid and reliable.

The unitary, generally triangular hangar plate 42 includes two mutually offset but generally vertical portions: an upper portion containing the two bores 134 for the roller bearings, and a lower portion containing the single bore 158 for pivot 38 by which column 30 is suspended. That lateral offset of the two hangar portions at 167 permits the column weight to be applied to the hangar substantially directly below the roller contact area on track 60. The center of gravity of the column is a few inches outboard of that area, due to placement of the locking apertures on the existing track, which gives the entire column a tendency to swing inward slightly when the locking pins are released. That swinging tends to hold the column free of the side wall as it is moved along the track, and is readily overcome by moderate pressure as control handle 100 is released to lock the column in a new position.

As already indicated, an important advantage of the present suspension structure is the close approach that is possible between the two columns mounted on each track. In placing a full load in a car, one end of the car is loaded first, and the lading is secured by placing and locking a column against each edge of the lading face. The second column on each track is then moved close to the locked column to give access to the other end of the car. If column 30 of FIG. 2, for example, has been placed with its working face 35 against an initial full half load, the second column is placed as shown in phantom lines at 30a.

In the present structure, that position of closest approach is defined by direct contact of primary members 42 of the two carriages. Each of those hangar plates terminates rearwardly in an abutment 169 (FIG. 12) which projects beyond the plane of the rear face of the column. Abutments 169 thus protect the roller sprocket teeth from damage and also insure spacing of at least the upper portions of the columns themselves, where they are most handled by the operators. A lower spacing block 170 is preferably mounted at the base of each column, projecting about the same distance as upper abutment 169. A total spacing of two inches, for example, between the column faces greatly reduces the possibility of injury to operators' fingers. For a typical beam depth of eight inches, the two columns then occupy only 18 inches of the car door, leaving ample space for loading the second end of the car. Moreover, if only about two feet is left between the two lading faces the second columns can readily be shifted to secure the second half of the load.

We have found that convenient and accurate control of the carriage requires that its design satisfy several requirements which tend to conflict with each other. First, proper alignment on the track requires adequate spacing of the two rollers from each other along the track. Second, to allow the two columns on each track to approach each other closely, the roller on the side away from the lading must project only slightly beyond the rear face of the column. Hence, it can be journaled only a limited distance from the midplane of the column.

As a third condition, we have discovered that smooth and accurate manual positioning of the carriage by drive chain 50 requires that the total load be shared fairly evenly between the two rollers. More particularly, if the roller that is not coupled to the chain, which is preferably the one toward the lading, carries too little of the total load, the drive tends to need more force, and the carriage movement becomes less uniform, making it harder to align the locking pins with the desired track apertures. That difficulty is believed to result from a tendency for the less loaded roller to lift from the track under certain conditions, reducing its tracking power and allowing the carriage to twist on the track. Although such twisting is checked by contact of the roller sprocket teeth with the sides of the holes on the track, such contact appears to increase the friction that must be overcome by the manual drive. Also, as each individual tooth contacts the track and slides into its sprocket hole, the reaction force varies, tending to make the drive uneven. Whatever the precise explanation, smoother and more accurate manual control has been found to be obtained when the center of gravity of the column is suspended relatively close to the mid-plane between the two roller axes. If that condition is combined with the relatively wide roller spacing of the first requirement mentioned above, the result is scarcely compatible with the restricted position of the rear roller by the second condition.

We have found, nevertheless, that the three described requirements can be made effectively compatible by restricting the design to a narrowly defined relationship of parameters.

More particularly, we have found that if the displacement of the point of load application from the midplane of the rollers is limited to from about one tenth to about one fifth of the spacing between the rollers, all three of the above requirements can be met satisfactorily. That is, taking the requirements in reverse order, that limitation upon the point of load application from the roller midplane causes the more lightly loaded forward roller to carry from about 0.4 to about 0.3 of the total load, which is found to counteract satisfactorily any tendency of the roller to lift from the track. Also, for rollers of typical overall diameter, nearly equal to half the width of the column, the defined limitation allows the rear roller to be positioned near enough the column midplane to project only slightly beyond the column edge. Finally, the stated limitation allows the spacing of the forward roller from the column midplane to be large enough, relative to that of the rear roller, to give adequate roller separation for maintaining carriage alignment on the track. Although that roller separation is less than might be supposed necessary, it appears that the relatively even sharing of the load between the two rollers improves their ability to maintain alignment effectively.

Figure 13:
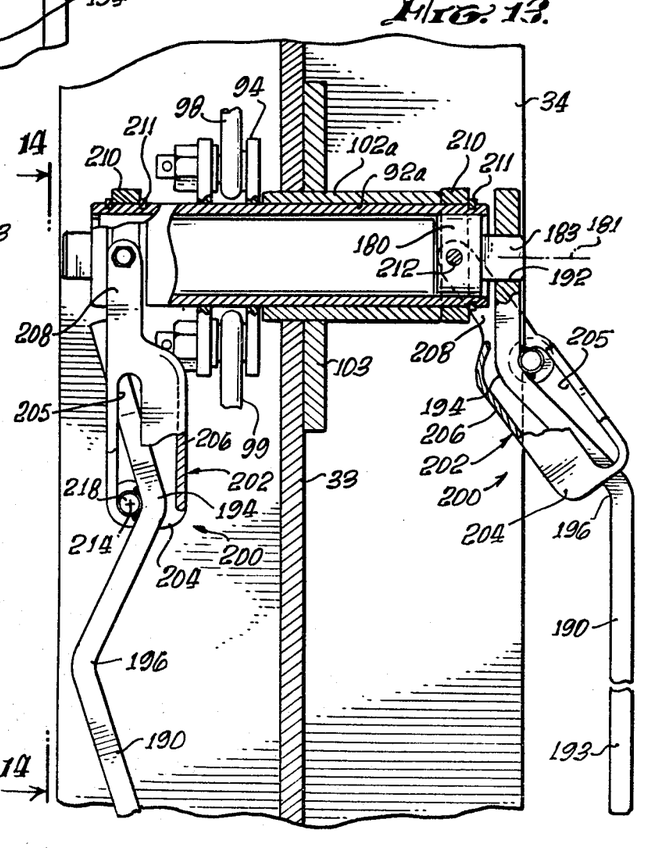
FIG. 13 is a section corresponding to FIG. 7 but representing a modification.
Figure 14:
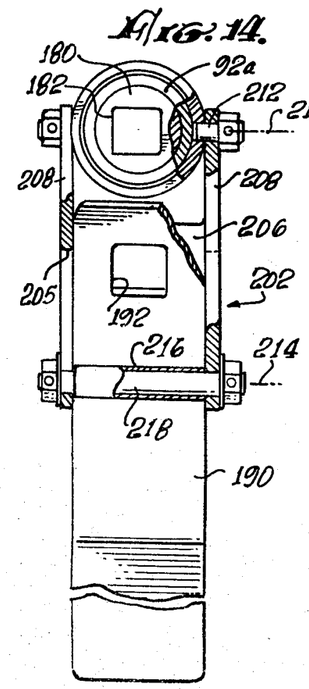
FIG. 14 is fragmentary elevation in the aspect of line 14—14 of FIG. 13.

FIGS. 13 and 14 represent a modified clutch and crank mechanism for controlling the locking pins. As illustratively shown, the sleeve bearing 102a is mounted on the column web as in the mechanism of FIG. 7. The tubular shaft 92a carries dual crank plates 94 coupled as before via links 98 and 99 to the respective locking pins. Shaft 92a carries at each end a rigidly mounted plug 180 with a square coupling formation 182 or similar fitting projecting axially from the shaft but still preferably recessed between the column flanges 34. Each of the handles 190 typically comprises a simple bar of rectangular section with a square hole 192 at one end which fits freely the square shaft end. It will be evident that shaft 92a might alternatively be solid, for example, with couping formations of any desired type formed directly on the shaft. The lever portion 193 of the handle is typically offset from the coupling end, as by the two opposite angular bends at 194 and 196, so that when the handle is coupled to the shaft, as at the right of FIG. 13, its lever portion is well free of column flanges 34 and can swing freely about the shaft axis. In operation, one or other of the two handles 190 is manually coupled to crank shaft 92a and is then operated in normal fashion to retract or project the locking pins.

After the column has been locked in a selected position in the car, the handle is shifted axially to disconnect it from fitting 182. The handle may then be simply released, whereupon it becomes suspended by means of the pivoted link 200, and swings under gravity to an idle position within the flange recess of the column, as shown at the left of FIG. 13. The construction and mounting of link 200 is such that the handle may be moved by hand with complete freedom within a definite range of positions. That range is limited to a plane that passes through the axis of shaft 92a, and is further limited to certain translational and rotational movements within that plane. Although strictly limited, that handle freedom is ample to permit convenient and normal manipulation to return the handle to operating position connected to the crank shaft. In fact, the described restriction to an axial plane is found to facilitate such manipulation since it tends to guide the coupling formations toward mating engagement.

Each of the illustrative link structures 200 of FIGS. 13 and 14 comprises the ring 210 and the link member 202. Ring 210 is mounted adjacent an end of shaft 92a for rotation about the shaft axis, and is typically journaled directly on the shaft with retaining ring or rings 210. Ring 210 carries the trunnion bearings 212 which define the pivot axis 213, perpendicular to shaft axis 181. Each link 202 is of general channel form, with the two parallel plate portions 204 rigidly connected by the web portion 206. Plates 204 are longitudinally slotted at 205 and have longitudinally extending arms 208 by which the link is pivotally mounted on trunnion bearings 212.

Handles 190 are mounted on the respective link members 202 for relative swinging and sliding movement, typically on a transverse pivot axis 214 which is fixed with respect to the handle and slides along the slots 205 of the links. As illustrated, the tube 216 is rigidly mounted on handle 190, as by welding, typically in the crook of bend 194, and serves as a bearing for the bolt 218. That bold slides freely in the aligned slots 205, with its nut pinned or otherwise retained in position to allow sliding clearance on plates 204. That play can be ample without causing the bolt to cock and jam in the slide, since the handle, being restricted by web 206 to general parallelism to link member 202, is smoothly guided between plates 204 in the plane of FIG. 13. When in idle position, each handle is effectively entirely free of shaft 92a, allowing the shaft to be rotated by the other handle. As in the mechanism of FIG. 7, both handles may be coupled to the shaft at the same time if desired.

Alternatively, a pivot bolt corresponding generally to bolt 218 may be mounted rigidly on plates 204 and allowed sliding and rotary movement relative to the handle, as in a slide constructed, for example, along the upper face of the handle between the two bends at 194 and 196. Such a slide may comprise, for example, an elongated plate having the same width as the handle and having its ends welded to the handle near the respective bends.

Detent or spring structure of any suitable type may be provided if desired, tending to retain the handle in coupled relation to the shaft, or to hold the handle in a definite idle position relative to the column flanges. However, it is ordinarily preferred to maintain the basic simplicity of the structure as shown, with its inherent advantages of economy and reliability.

As will be recognized by those skilled in the art, many modifications may be made in the illustrative structures that have been shown and described without departing from the true spirit and scope of the invention.

We claim:

1. Mechanism for suspending a single column load divider generally vertically from a single overhead track which extends along one side wall of a vehicle lading compartment and which includes a horizontal flange having a rack-like row of sprocket apertures, said mechanism comprising an elongated carriage frame, two sprocketed rollers, adapted to ride the track flange with their sprocket teeth engaging sprocket apertures, means for journaling the rollers on the carriage frame on respective mutually spaced parallel roller axes adjacent opposite ends of the carriage frame, with the sprocket teeth of both rollers confined to a common plane and in position to engage said track apertures and thereby to maintain the carriage frame positively aligned with the track, and means for coupling one end of the column load divider to the carriage frame.

2. Mechanism according to claim 1, wherein said column load divider comprises a web extending perpendicularly between spaced parallel flanges, said carriage frame includes a generally vertical hangar plate and said coupling means comprise a mounting plate removably mounted on said column flanges in spaced parallel relation to said web, aligned bores in the mounting plate and in the web, and pivot means mounted in said aligned bores for pivotally mounting the hanger plate between the mounting plate and the web with capability for disassembly only by removal of the mounting plate.

3. Mechanism according to claim 2 wherein said pivot means comprises a pivot pin fixedly mounted in said bore in the mounting plate and fittingly received in said bore in the web.

4. Mechanism according to claim 2 wherein the mounting plate and the web are mutually spaced by a distance which exceeds the thickness of the hangar plate by a predetermined value, and a spacing collar is insertable on said pivot means between the mounting plate and the web on a selected side of the hangar plate to adjust the position of the load divider laterally of said track.

5. Mechanism according to claim 1 including means for maintaining the axis of each roller approximately parallel to the axis of the other roller independently of the integrity of said roller journaling means, said axis maintaining means comprising a keeper plate, two bores in the keeper plate on axes mutually spaced by the same spacing as said roller axes, and secondary means for journaling the rollers in the respective keeper plate bores independently of the first said roller journaling means.

6. Mechanism according to claim 5 wherein the first said roller journaling means comprise sleeve bearings rigidly mounted on said carriage frame on the respective roller axes and extending axially within the respective rollers beyond the plane of said keeper plate, and stub shafts journaled in said sleeve bearings and rigidly mounted on the respective rollers.

7. Mechanism according to claim 5 wherein said keeper plate includes retaining portions extending laterally below said horizontal track flange and closely spaced therefrom directly opposite the respective rollers.

8. Mechanism according to claim 5 wherein said track includes a rigidly mounted flange extending upward from said horizontal flange inward of said rollers, and said keeper plate includes a back retaining portion extending laterally therefrom and down behind said upwardly extending flange in closely spaced relation thereto.

9. In a column load dividing gate which comprises a single vertical column of I-beam section movable along a track and lockable by locking pins projectable to engage upper and lower tracks; control mechanism for the locking pins comprising a sleeve bearing rigidly mounted in a through bore in the web of the column, a tubular shaft journaled solely by said sleeve bearing, dual crank means rigidly mounted on one end of the shaft adjacent the corresponding end of the sleeve bearing and coupled to the respective locking pins, a centrally apertured cap at each end of the shaft, the cap aperture having a diameter smaller than the internal diameter of the shaft, a pair of tubes mounted in the shaft, each tube having an outer end portion freely fitting a cap aperture and an enlarged inner end portion freely fitting the inner diameter of the shaft and forming an outwardly facing axial shoulder adapted to engage the inner face of the cap, a handle rigidly mounted on the outer end of each tube outwardly of the cap, spring means within said tubes for yieldably urging the tubes toward normal axial positions in which their inner ends substantially abut each other and their handles are adjacent the respective caps and substantially within the outline of the column flanges, and spline means for rotatively coupling each tube to the shaft in response to outward axial tube movement from said normal position.

10. In a load dividing gate movable along a track and lockable by locking pin means projectable to engage the track, said gate having a vertical edge structure comprising spaced flanges with a web recessed between the flanges and forming therewith a channel; control mechanism for the locking pin means comprising a crank shaft journaled on said web and terminating outward of the web in a coupling formation, crank means mounted on the shaft and coupled to the locking pin means for operating the same in response to shaft rotation, a handle rigidly carrying at one end coupling means for engaging and disengaging said coupling formation in response to respective movements of said one handle end along the shaft axis to and from said one end of the shaft, a support member mounted for rotation about the shaft axis, and linkage means for interconnecting the handle and the support member with freedom of relative movement sufficient to permit said axial handle movement and to permit handle movement to and from a stowed position radially spaced from the shaft and substantially within the channel.

11. Control mechanism according to claim 10 wherein said linkage means comprise a link member pivoted on said support member on a pivot axis perpendicular to the shaft axis, and slide means coupling the handle to the link member for relative sliding movement.

12. Control mechanism according to claim 10 wherein said linkage means comprise an elongated link member pivoted at one end on said support member on a pivot axis perpendicular to the shaft axis and including two spacedly opposed, longitudinally slotted flanges, and pivot means defining a pivot axis fixed relative to the handle and mounted on the link member for sliding movement along the flange slots.

13. Support structure for a single load dividing column which is movable along an upper track and is lockable by locking pins projectable to engage the upper track and a lower track, the upper track including a horizontal flange which rigidly carries an upwardly extending vertical flange, a longitudinal row of locking apertures between the vertical flange and the car side wall and a longitudinal row of sprocket holes between the vertical flange and the edge of the horizontal flange; said support structure comprising a carriage frame on which the column is mounted and which normally forms the sole support for the column, two sprocketed rollers and primary journal means for journaling the rollers on the carriage frame on respective horizontally spaced roller axes with their peripheries riding the horizontal track flange and their sprocket teeth engaging the sprocket holes to form the sole normal support for the carriage frame and column, a keeper plate and secondary journal means for journaling said rollers with respect to the keeper plate independently of said primary journal means on respective axes which normally coincide with said axes, first and second retaining means rigidly mounted on the keeper plate and extending laterally therefrom, said first retaining means extending below the horizontal track flange in closely spaced relation thereto, and said second retaining means extending above and then down behind the vertical track flange, said retaining means terminating in such spaced relation to each other as to form with the keeper plate an effectively unitary enclosure which positively couples the keeper plate to the track independently of both said primary and secondary journaling means, and flexible coupling means extending between the keeper plate and said column independently of the carriage frame.

14. Support structure for each of two single column load dividing gates which are movable along an upper track and are lockable by locking pin means projectable to engage locking apertures in the track, said track including a horizontal support surface with a longitudinal row of sprocket holes, each column having a forward load engaging face and a rearward face, and the columns being movable to place their rearward faces within a predetermined small interval of each other; each said support structure comprising carriage means including a carriage frame with pivot means on which the column is pivotally mounted on a support axis parallel to and approximately midway between said column faces, two sprocketed rollers journaled on the carriage frame on respective horizontally spaced forward and rearward roller axes with the roller peripheries riding the support surface and with the sprocket teeth engaging said sprocket holes for aligning and retaining the rollers on the track, said rollers normally forming the sole support for the carriage frame and the column, manual drive means coupled to the rearward roller for moving the carriage along the track to align the locking pins means with a selected locking aperture, said rearward roller being journaled on the carriage frame in much position that the roller projects rearwardly of the rear column face no more than half said interval, and said forward roller being journaled on the carriage in such position that the vertical plane midway between the roller axes is spaced forward of said support axis by from about one tenth to about one fifth of the separation of the roller axes.

15. Support structure according to claim 14 wherein said small interval is approximately one quarter of the separation of said column faces.

16. Support structure according to claim 14 wherein said small interval exceeds the thickness of a man's hand, and each carriage frame includes an abutment which projects rearwardly of said rearward column face approximately half said interval.

17. Support structure according to claim 16 including also abutment means adjacent the lower end of each said column which projects rearwardly of said rearward column face approximately half said interval.

18. Support structure according to claim 14 wherein each said carriage frame consists essentially of a unitary, generally vertical hangar plate of generally triangular form with said rollers journaled adjacent respective upper plate corners and with said support axis adjacent a lower plate corner, the lower plate portion being offset toward the track relative to the upper plate portion by at least approximately the axial length of each roller.

19. In a load dividing gate comprising a single vertical column which is mounted for movement along an upper track adjacent a car side wall and is lockable by projection of locking pins into engagement with the upper track and with a lower track; the combination of a unitary column of I-beam section with the column web cut away adjacent each end of the column and replaced by a pair of web plates rigidly mounted between the column flanges in oppositely spaced, generally parallel relation to the plane of the web with the inner end portions of each pair of web plates inclined toward the column web, said web plates forming with the column flanges vertically elongated protective enclosures for the locking pins, a pin guide block rigidly joining the web plates of each pair at their outer ends, a locking pin mounted between the web plates of each pair and guided in a fitting slot in the guide block for vertical sliding movement substantially in the plane of the column web, and pin operating means including an elongated link coupled to each pin and extending generally vertically therefrom through a clearance aperture in the portion of a web plate.

20. Combination according to claim 19 wherein the plane of said column web is generally parallel to the car side wall, and each pin operating link extends generally parallel to the column web on the side thereof toward the car side wall.

21. Combination according to claim 19 wherein the plane of said column web is generally parallel to the car side wall with a flange face of the column facing the load; at least the lower lock pin comprises a substantially flat elongated member mounted generally parallel to the plane of the column web with the longitudinal pin edge that faces away from the load indented with rack teeth, and with the flange face of the column that faces away from the load apertured for insertion of a tool in the plane of the pin to engage the rack teeth and to pry the pin away from the track; further characterized in that the web plate between the lower lock pin and the side wall is apertured for insertion of a tool to engage said rack teeth from the side when access is available through an open car door.

22. In mechanism for supporting a single column load divider on an overhead track which includes a horizontal flange, which mechanism includes a carriage frame on which the column is mounted, two rollers adapted to ride the track flange, and primary journaling means for journaling the rollers on the carriage frame on respective parallel roller axes spaced longitudinally of the track; means for maintaining the axis of each roller approximately parallel to the axis of the other roller independently of the integrity of said primary roller journaling means, comprising    a keeper plate,    two bores in the keeper plate on axes mutually spaced by the same spacing as said roller axes,    and secondary means for journaling the rollers in the respective keeper plate bores independently of said primary roller journaling means.

23. In combination with two oppositely facing single column load dividers mounted in generally vertical positions upon respective carriage frames which are movable along a common upper track, each column having a forward load engaging face and a rearward face;

means supporting each column on its carriage frame for limited pivotal movement in a vertical plane parallel to the track,    the carriage frames being movable to place the rearward column faces closer together than half the thickness of each column between its said faces,    and upper and lower abutment means adjacent the upper and lower ends of each column engageable to maintain the rearward faces thereof mutually spaced throughout their lengths by at least the thickness of a man's hand.

* * * * *